No. 855,314. PATENTED MAY 28, 1907.
A. L. HOLMES.
METER CONNECTION.
APPLICATION FILED MAR. 1, 1906.

Witnesses
J. P. Goodell
A. Allgier

Inventor
Alba L. Holmes,
By Ithiel J. Cilley
Attorney

UNITED STATES PATENT OFFICE.

ALBA L. HOLMES, OF GRAND RAPIDS, MICHIGAN.

METER CONNECTION.

No. 855,314.  Specification of Letters Patent.  Patented May 28, 1907.

Application filed March 1, 1906. Serial No. 303,720.

*To all whom it may concern:*

Be it known that I, ALBA L. HOLMES, a citizen of the United States, residing at Grand Rapids, in the county of Kent and State of Michigan, have invented certain new and useful Improvements in Meter Connections, of which the following is a specification.

Figure 1:
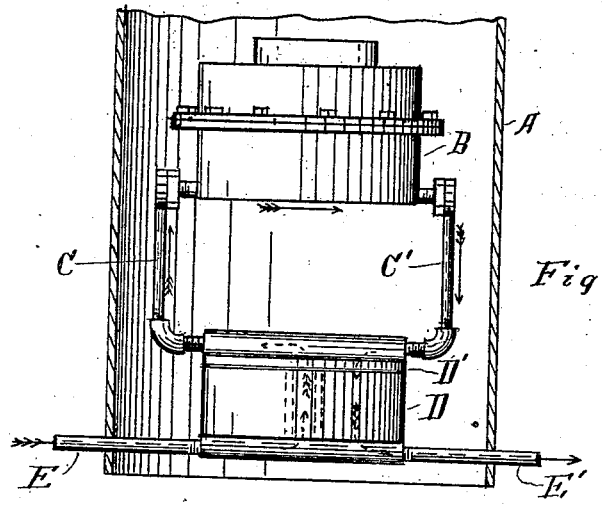
Figure 2:
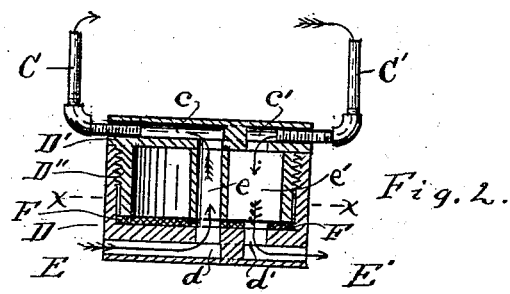
Figure 3:
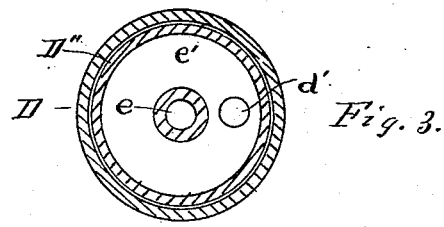

My invention relates to improvements in connections for coupling water meters, &c., to the mains, and its object are: first, to provide a means whereby the connections may be made with the mains and the meter may, afterward, be connected without the necessity of using an ordinary wrench for adjusting small nuts and bolts; second, to provide means for forming the inflow and the outflow in one construction and yet to have them entirely separate with water tight joints between, and, third, to reduce the cost to the minimum without sacrificing utility. I attain these objects by the mechanism illustrated in the accompanying drawing, in which Figure 1 is an elevation of the meter and connections shown in a sectional view of the meter box; Fig. 2 is a sectional view of the connecting cylinder showing the course of the water in entering and leaving it, and Fig. 3 is a sectional plan of the same on the line $x\ x$ of Fig. 2.

Similar letters refer to similar parts throughout the several views.

A represents the meter box, for which any approved form of box may be used.

B represents the meter and D D' represents the coupling cylinder or the mechanism by which the meter is connected with the water main, or laterals shown at E E'. The coupling cylinder is constructed in two parts, D and D'. D is directly connected with the water mains or laterals, as at E E', and is provided with ports or openings $d\ d'$. The portion D' of the cylinder had a downwardly projecting body D'' which is provided with a screw thread near its upper end, arranged to mesh with a corresponding screw thread in the portion D so that they may be screwed firmly together, and a central tube $e$ arranged to register with the opening $d$ in the portion D and connecting with the outlet pipe or hole $c$, so that water flowing in at E will follow the direction of the arrows up through the pipe C, through the meter B and out through the pipe C' to the opening $c'$, the chamber $e'$, the opening $d'$ and out to the lateral discharge at E', the connections between the pipes C and C' and the meter and cylinder, being made in the usual manner.

I arrange to form a water tight joint between the body D'' and the bottom of the portion D of the cylinder by placing any ordinary, available form of packing or gasket, as F F, between them in the usual manner, substantially as shown in Fig. 2, so that a chamber $e'$ is formed around the tube $e$ to which no water can get access from the tube $e$ except by passing through the meter, as indicated by the course of the arrows in Figs. 1 and 2, the passage ways $c\ c'$ and $d\ d'$ each being separated by division walls, as shown in Fig. 2.

I deem the use of the large chamber $e'$ in the coupling cylinder, as particularly advantageous as it forms a water pocket or reservoir between the meter and the discharge that seems to cushion, or otherwise regulate the outflow of water from the meter in such a manner as to render the measurement of the water passing through the meter much more accurate than where both the inflow and the outflow are of uniform size throughout the entire passage, especially if the water is made to turn abrupt, square corners in its passage out.

Having thus fully described my invention, what I claim as new and desire to secure by Letters Patent of the United States is:—

In combination with a water meter, an inflow and an outflow pipe, a large intermediate cup having a small central opening in the bottom, and an outflow opening to one side of the center, the sides of the cup extending up and having a screw thread in the inside surface, a cap having an annular body with a screw thread on its periphery to mesh with the screw thread in the cup, forming a water tight joint, a small central tube integral with the cap and extending down forming a water tight joint with the bottom of the cup and a water way from the inflow pipe to the meter, and an outflow pipe from the meter into and out of the large cup, as shown and described.

Signed at Grand Rapids Michigan February 26, 1906.

ALBA L. HOLMES.

In presence of—
 A. ALLGIER,
 I. J. CILLEY.